United States Patent [19]

Bowers

[11] Patent Number: 5,027,141
[45] Date of Patent: Jun. 25, 1991

[54] CAMERA SUPPORT

[76] Inventor: David W. Bowers, 16521 80th Ave. W., Taylor Ridge, Ill. 61284

[21] Appl. No.: 564,922

[22] Filed: Aug. 9, 1990

[51] Int. Cl.⁵ ............................................. G03B 17/56
[52] U.S. Cl. ...................................... 354/82; 354/293
[58] Field of Search ........................... 354/81, 293, 82

[56] References Cited

U.S. PATENT DOCUMENTS 3,402,906  9/1968  Wellman ........................ 354/293 X
4,027,318  5/1977  Knapp ................................. 354/293

Primary Examiner—Michael L. Gellner
Attorney, Agent, or Firm—Henderson & Sturm

[57] ABSTRACT

A support for a typical hand-held camera is provided for supporting the camera on a flat surface, for example. The support is of L-shaped design with one leg adapted to extend across the bottom of the camera body and the other leg adapted to project forwardly beneath the camera lens to stabilize the camera while at rest so as to prevent the weight of the lens from tipping the camera downwardly and forwardly. The support, affixed to the bottom of the camera body, thus protects the lens against damage. Additionally, the forward leg is spaced below the lens and thus gives the user an additional grasp on the camera in use. Further, the underside of the support has a tapped bore for direct mounting on a typical tripod, for example.

6 Claims, 1 Drawing Sheet

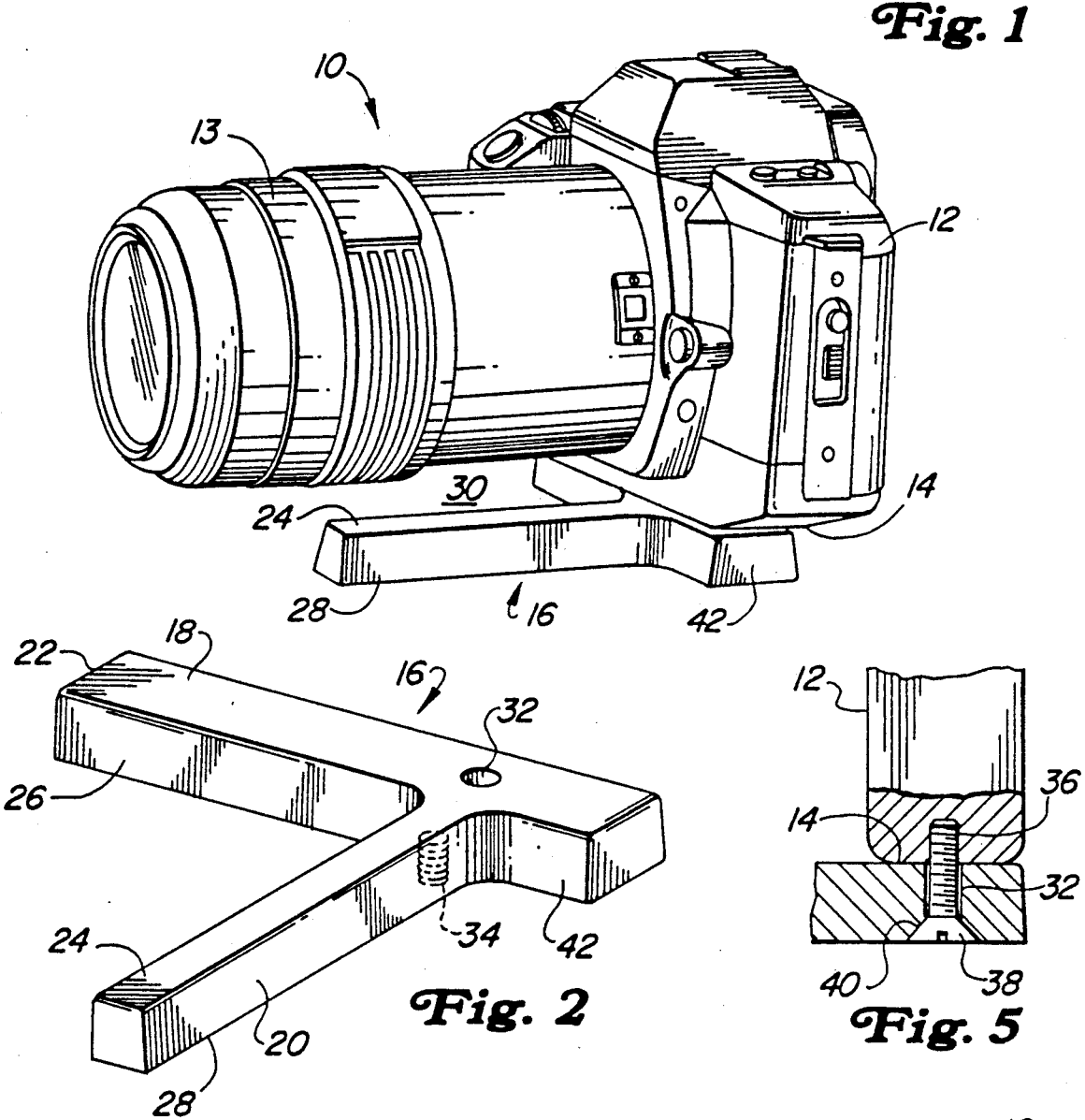
Fig. 1
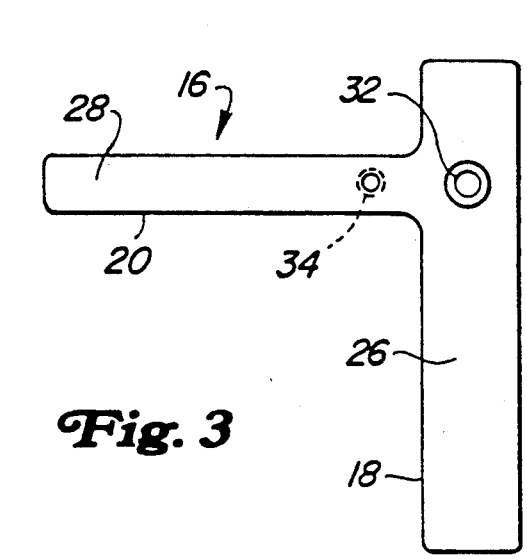
Fig. 2
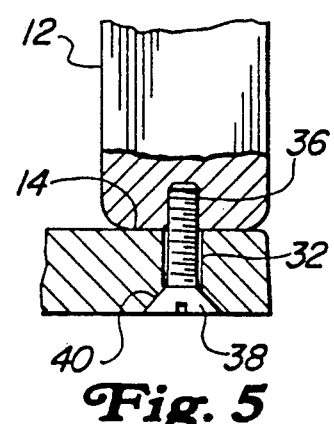
Fig. 5
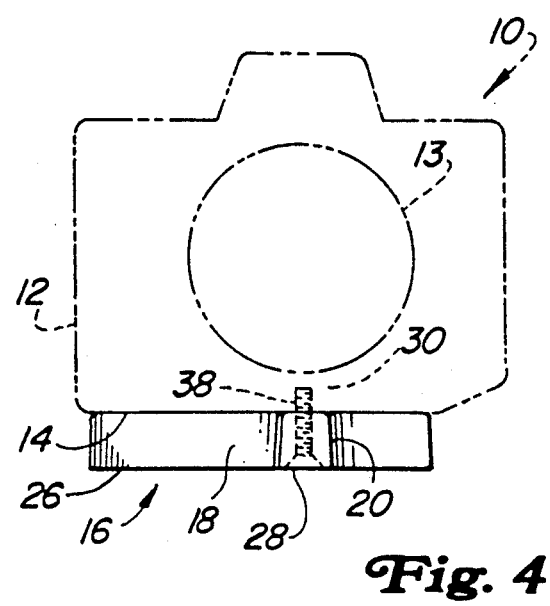
Fig. 3
Fig. 4

CAMERA SUPPORT

BACKGROUND AND SUMMARY OF THE INVENTION

A typical camera of the hand-held type includes a transverse body from which a relatively long lens projects forwardly. The weight of the lens overbalances the camera downwardly and forwardly and, when the camera is placed on a hard, flat surface, the lens is subject to damage from contact with the surface. Thus great care is required by the user so as to avoid lens damage.

According to the present invention, lens damage of the character noted is avoided by the use of a novel support affixed to the bottom of the camera body for the purpose of stabilizing the camera at rest so that downward tipping of the camera is avoided. The support features a pair of coplanar legs having horizontal under surfaces, giving the support the shape of an L. One leg extends across the camera body and the other projects forwardly beneath the lens. Means is provided for affixation of the support to the camera body.

A feature of the support is that the leg projecting forwardly is spaced below the bottom of the lens so as to leave a space through which the user may insert his fingers so as to get a solid grip on the camera during use. Still further, the means for affixation of the support to the camera body utilizes the usual tapped bore provided in the camera body for attachment of a tripod. And further yet, the support includes a tapped bore that duplicates the tripod-attaching bore so that the support-equipped camera can be used with a tripod or other additional support.

Further objects are to provide the support in a simple, low-cost, durable fashion easily attachable to and detachable from a typical camera.

The foregoing and other features and advantages of the invention will appear as a preferred embodiment thereof is disclosed in detail in the ensuing description and accompanying drawings.

DESCRIPTION OF THE DRAWINGS

FIG. 1 is a perspective of a camera with the support affixed thereto.

FIG. 2 is an enlarged perspective of the support by itself.

FIG. 3 is a bottom view, on a reduced scale, of the support.

FIG. 4 is a smaller-scale front view of the assembled camera and support.

FIG. 5 is a fragmentary section showing the attachment of the support to the camera.

DETAILED DESCRIPTION OF A PREFERRED EMBODIMENT OF THE INVENTION

A camera of popular type is indicated at 10 as having a transverse body 12 from which a lens 13 projects forwardly in overhanging relation to the horizontal plane of the bottom 14 of the body 12.

The inventive support is designated 16 in its entirety and preferably comprises an L-shaped member of one-piece construction, formed, for example, of aluminum or other light-weight durable material. The support is made up of a pair of right-angle-related legs 18 and 20 having horizontally coplanar upper and lower surfaces 22 and 24 respectively for the leg 18 and 26 and 28 for the leg 20. When the support is affixed to the camera, the under surfaces of the legs rest relatively solidly on a flat surface; the top surface of the leg 18 engages flatly against the bottom surface 14 of the camera body 12 (FIG. 5); and the forward leg 20 projects forwardly in vertically spaced relation below the bottom of the overhanging lens 13, leaving a space 30 of sufficient dimension to enable the user to insert the fingers of one hand whereby the user obtains an improved grip on the camera-support assembly.

As best seen in FIGS. 2 and 3, the support has a vertical through bore 32 as well as a blind tapped bore 34. The camera body, as is typical, has a vertical tapped bore 36. The support is tightly attached to the camera by the use of a flat-head screw 38 passed upwardly through the bore 32 and threaded into the camera body tapped bore 36. The lower end of the bore 32 opens as recess 40 to accommodate the head of the screw 38, thus keeping the flat under surface of the support intact. In the event that the camera-support assembly is desired to be used with a tripod, for example, the tapped bore 34 in the support will receive the usual threaded stud of the tripod.

When the support is solidly affixed to the camera, the cross leg 18 adds stability and mass to the camera body, which function is augmented by a stub leg 42 provided as a rigid part of the support, preferably aligned with or as an extension of the cross leg 18. As noted before, the forward leg stabilizes the camera against forward and downward tilting. Further, when the camera and support assembly is oriented so that the front or forward leg 20 points downwardly, it, being slender and tapered forwardly, affords a convenient means for hanging the assembly via suitable looped means such as the user's belt or waistband or a holster or the like.

Features and advantages other than those specifically pointed out herein will readily occur to those versed in the art, as well as alterations in the design of the support, all of which may be realized without departure from the spirit and scope of the invention.

We claim:

1. In combination with a camera having a transverse body including a horizontal bottom, an upright front and a lens projecting forwardly from the frame in vertically spaced relation to the horizontal plane of the bottom, a camera support comprising a member having the shape of an L as seen from above and including means for the fixed attachment thereof to the camera, said member having a transverse leg disposed beneath and essentially flat-wise against the bottom of the body and a forward leg sized with the transverse leg and extending forwardly beneath and in vertically spaced relation to the underside of the lens, said legs having horizontally coplanar bottom faces adapted to rest on a level surface and the forward leg having such length as to prevent forward and downward tilting of the camera because of the overhanging length and weight of the lens.

2. The invention according to claim 1, in which the camera body has a vertical tapped bore opening at the bottom of the body and the means for the attachment of the support to the camera includes a vertical through bore in the transverse leg in vertical alignment with the tapped bore and screw means extending upwardly through the leg bore and threaded into the tapped bore.

3. The invention according to claim 2, in which the screw means includes a lower end having a tool-screwing head and the support member leg has a bottom recess vertically aligned with the leg bore and accommodating the head of the screw means.

4. The invention according to claim 2, in which one of the legs of the support members has a vertical tapped bore matching the tapped boar in the camera body and spaced from the leg through bore.

5. The invention according to claim 1, in which the support members is of one-piece construction.

6. The invention according to claim 5, in which the support member includes a stub leg sized with the member at the junction of the transverse and forward legs and projecting from the member in transverse alignment with and oppositely to the transversed leg.

* * * * *